United States Patent
Kawamura et al.

(10) Patent No.: US 10,303,047 B2
(45) Date of Patent: May 28, 2019

(54) OPTICAL INTEGRATOR AND VIDEO PROJECTION DEVICE USING SAME

(71) Applicant: HITACHI CHEMICAL COMPANY, LTD., Tokyo (JP)

(72) Inventors: Tomoto Kawamura, Tokyo (JP); Toshihiro Kuroda, Tokyo (JP); Daichi Sakai, Tokyo (JP); Toshiyuki Takaiwa, Tokyo (JP); Yutaka Kawakami, Tokyo (JP); Toshiteru Nakamura, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 84 days.

(21) Appl. No.: 15/513,498

(22) PCT Filed: Sep. 7, 2015

(86) PCT No.: PCT/JP2015/075304
§ 371 (c)(1),
(2) Date: Mar. 22, 2017

(87) PCT Pub. No.: WO2016/047426
PCT Pub. Date: Mar. 31, 2016

(65) Prior Publication Data
US 2017/0299955 A1    Oct. 19, 2017

(30) Foreign Application Priority Data
Sep. 24, 2014    (JP) .................................. 2014-193285

(51) Int. Cl.
*F21V 8/00* (2006.01)
*H04N 9/00* (2006.01)
(Continued)

(52) U.S. Cl.
CPC ......... *G03B 21/208* (2013.01); *G02B 6/0006* (2013.01); *G02B 6/0008* (2013.01);
(Continued)

(58) Field of Classification Search
CPC ............................ G02B 6/0041; G02B 6/0016
(Continued)

(56) References Cited

U.S. PATENT DOCUMENTS 6,301,418 B1    10/2001   Freier et al.
7,218,824 B2 *   5/2007   Franklin .............. G02B 6/0001
                                                          385/123
(Continued)

FOREIGN PATENT DOCUMENTS

CA    2134902    *  5/2000
JP    07-198953 A    8/1995
(Continued)

OTHER PUBLICATIONS

J-Plat-Pat; English Translation of JP 2007-280793,A; Sep. 3, 2018; 49p.*

(Continued)

*Primary Examiner* — Laura K Tso
(74) *Attorney, Agent, or Firm* — Volpe and Koenig, P.C.

(57) ABSTRACT

The purpose of the present disclosure is to provide a small optical integrator for increasing color mixing property and homogeneity. An optical integrator is provided with a light entrance surface and exit surface (002, 003), and side surfaces (004, 005, 006, 007) that connect the entrance surface and the exit surface, and is internally filled with a light guide material having a refractive index. The light guide material contains scattering particles for scattering light that have a refractive index different from the refractive index of the light guide material. The light that has entered via the entrance surface propagates from the entrance surface side toward the exit surface while being scattered by the scattering particles in the light guide material, wherein part of the scattered light is guided to the exit surface by (Continued)

propagating while being confined, by internal reflection on the side surfaces, in the light detector.

12 Claims, 16 Drawing Sheets

(51) Int. Cl.
*G02B 27/01* (2006.01)
*G03B 21/20* (2006.01)

(52) U.S. Cl.
CPC ......... *G02B 6/0016* (2013.01); *G02B 6/0041* (2013.01); *G03B 21/2013* (2013.01); *H04N 9/00* (2013.01); *G02B 27/0101* (2013.01); *G02B 2027/0118* (2013.01)

(58) Field of Classification Search
USPC .......................................................... 362/558
See application file for complete search history.

(56) References Cited

U.S. PATENT DOCUMENTS

| | | | | |
|---|---|---|---|---|
| 7,954,989 | B2* | 6/2011 | Fan | G02B 6/0025 362/558 |
| 8,109,666 | B2* | 2/2012 | Sawada | G02B 6/0018 362/628 |
| 2006/0034083 | A1 | 2/2006 | Chung | |
| 2006/0153511 | A1 | 7/2006 | Franklin et al. | |
| 2007/0058135 | A1 | 3/2007 | Morikawa et al. | |
| 2012/0014127 | A1* | 1/2012 | Kanade | G02B 6/0045 362/558 |
| 2012/0229780 | A1 | 9/2012 | Sato | |
| 2015/0212258 | A1* | 7/2015 | Van Herpen | G02B 6/0085 362/609 |

FOREIGN PATENT DOCUMENTS

| | | |
|---|---|---|
| JP | H09-166712 A | 6/1997 |
| JP | 2000-131665 A | 5/2000 |
| JP | 2001-521199 A | 11/2001 |
| JP | 2004-334083 A | 11/2004 |
| JP | 2007-280793 A | 10/2007 |
| JP | 2009-176725 A | 8/2009 |
| JP | 2010-079117 A | 4/2010 |
| JP | 2012-014933 A | 1/2012 |
| JP | 2012-185369 A | 9/2012 |
| KR | 10-0617197 B1 | 8/2006 |
| WO | 2005/098532 A1 | 10/2005 |

OTHER PUBLICATIONS

International Search Report dated Oct. 13, 2015 in the International Application No. PCT/JP2015/075304.
Japanese Office Action dated Oct. 30, 2018 for the Japanese Patent Application No. 2014-193285.

* cited by examiner

OPTICAL INTEGRATOR AND VIDEO PROJECTION DEVICE USING SAME

TECHNICAL FIELD

The present invention relates to an optical integrator for uniformly mixing colors of light, and a picture projection device using the same.

BACKGROUND ART

Picture projection devices using a transparent rod are proposed in Patent Literatures 1 and 2, and a display device provided with a light diffusion layer is proposed in Patent Literature 3, for example.

CITATION LIST

Patent Literature

Patent Literature 1: JP 2004-334083 A
Patent Literature 2: JP 2000-131665 A
Patent Literature 3: JP 2010-79117 A

SUMMARY OF INVENTION

Technical Problem

In a picture projection device for display devices, such as a conventional projector, an optical system is generally employed which creates colors by temporally dividing light sources of the three colors of red, green, and blue. This color creation technology is based on a technique conventionally referred to as field sequential color (FSC).

In order to use FSC, it is necessary to illuminate a picture generation device, such as a LCOS or a DMD, mounted in the picture projection device, with light rays of the three colors having high color mixing property and homogeneity.

With regard to the color mixing property and homogeneity of light rays from a plurality of light sources, Patent Literature 1 describes a method for guiding light rays from a plurality of light sources to a rod using a lens. Patent Literature 2 describes a method for guiding light rays from a plurality of light sources to a rod after combining the light rays using a dichroic mirror.

As a method for homogenizing the light from a white light source, Patent Literature 3 describes a method involving the use of a light diffusion layer.

In recent years, wearable display devices, such as head mount displays, have been developed. A picture projection device for such display devices is mounted on the user's body, and is therefore required to have small power consumption and be bright and small-sized.

In order to reduce the size of the picture projection device, if a multi-chip light source is used in which a plurality of light sources is mounted in a single housing, a long rod would be required to satisfy color mixing property and homogeneity, assuming the rod used in Patent Literature 1 or 2. Accordingly, this solution is not suitable for size reduction. When the light diffusion layer as described in Patent Literature 3 is used, color mixing property cannot be satisfied because of the different positions of the plurality of light sources.

An object of the present invention is to provide a small optical integrator having increased color mixing property and homogeneity for reducing the size of the optical system of a picture projection device equipped with a multi-chip light source including a plurality of light sources mounted in a single housing.

Solution to Problem

The object is achieved by, for example, the invention set forth in the claims.

As a more specific example, an optical integrator according to the present invention is provided with a light entrance surface and exit surface, and a side surface connecting the entrance surface and the exit surface, and is internally filled with a light guide material having a first refractive index. The light guide material contains scattering particles for scattering light which have a second refractive index different from the first refractive index. The light that has entered via the entrance surface propagates from the entrance surface side toward the exit surface while being scattered by the scattering particles in the light guide material. Some of the scattered light is guided to the exit surface by propagating while being confined, by internal reflection on the side surface, in the light detector.

Advantageous Effects of Invention

A power-saving, bright, and small picture projection device can be provided at low cost.

DESCRIPTION OF EMBODIMENTS

Figure 1:
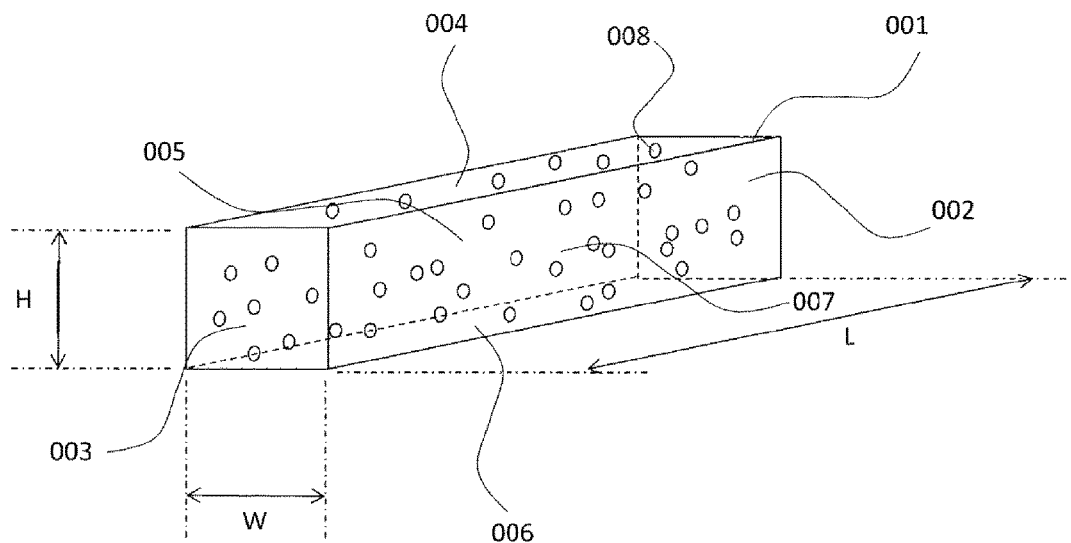
FIG. 1 is a schematic diagram of an optical integrator 001.

In the following, a mode for implementing the present invention will be described with reference to examples illustrated in the drawings. It should be noted, however, that the present invention is not limited to the examples.

EXAMPLE 1

A first example of the present invention will be described with reference to the drawings.

Initially referring to FIG. 1, an optical integrator 001 will be described.

The optical integrator 001 has a prismatic rectangular shape with a length L, a height H, and a width W, and is internally filled with a first medium having a predetermined high transparency and a first refractive index N1. The optical integrator 001 has entrance/exit surfaces 002, 003, and TIR side surfaces 004 to 007.

The entrance/exit surfaces 002, 003 are surfaces on which light enters or surfaces from which light exits.

According to Snell's law, it is known that a light ray that has an incident angle greater than a critical angle cannot propagate from a medium with a high refractive index to a medium with a low refractive index, and is internally reflected (Total Internal Reflection, hereafter referred to as "TIR"). Accordingly, in the examples, the side surfaces of the optical integrator 001 will be denoted as a "TIR side surface". The TIR side surfaces 004 to 007 are surfaces that have the function of confining the light entering via the entrance/exit surfaces 002, 003 inside the optical integrator 001 by TIR.

The optical integrator 001 is internally randomly loaded with scattering particles 008 filled with a second medium which has a second refractive index different from the refractive index of the first medium and which has high transparency. According to Snell's law, a light ray, when passing through a medium with a different refractive index, exits at a different angle from the entrance angle. Using this principle, the scattering particles 008 provide the function of causing a scattering by modifying the angle of the propagating light ray.

According to Snell's law, a greater diffuse function can be obtained by increasing the difference between the first refractive index and the second refractive index.

The scattering particles may have a spherical or any other shape. From the viewpoint of cost, the spherical shape of general-purpose products may be desirable.

When the scattering particles are spherical, the smaller diameter, the greater the angle of bending of the light ray will be, and higher scattering performance can be obtained. It may be desirable that the diameter be greater than the wavelength of the entering light ray, and not more than 10 times the wavelength of the light ray.

When the diameter of the scattering particles is smaller than the wavelength, greater scattering can be obtained. However, the probability of the light ray hitting the scattering particles becomes smaller, and, in order to ensure homogeneity, the loading rate of the scattering particles would have to be increased. Consequently, a decrease in efficiency becomes a problem.

Conversely, when the diameter is 10 times or more of the wavelength, the angle by which the light ray can be modified becomes smaller, and, in order to obtain desired color mixing property and homogeneity, the optical integrator 001 would have to be lengthened. This, however, would not contribute to the intended reduction in size.

Roughly the same applies to the case where the scattering particles have a shape other than spherical, and where the scattering particles do not have surface irregularities.

Of course, the surface of the scattering particles may be provided with a wavelength-order microstructure. In this case, it can be expect that, even when the shape is arbitrary and the maximum diameter of the scattering particles is increased, a large scattering effect will be obtained.

It may be desirable that the height H and width W of the entrance/exit surfaces 002, 003 be substantially equivalent to the entering light ray, or are at least minimum sizes taking the mounting tolerances into consideration. Of course, it is most desirable that the height H and width W of the entrance/exit surfaces 002, 003 be substantially equivalent to the entering light ray. In this case, adjustments may be made during assembly, taking mounting tolerances into consideration.

The luminance of the light ray that exits the entrance/exit surfaces 002, 003 is inversely proportional to area. Accordingly, if the area of the entrance/exit surfaces with respect to the area of the entering light ray is doubled, the luminance is reduced by half. If the area is increased, the confinement effect decreases, and color-mixing performance also becomes smaller. As a result, the loading rate of the scattering particles would have to be further increased, resulting in further deterioration of efficiency.

Conversely, if the area of the entrance/exit surfaces 002, 003 is made smaller than that of the entering light ray, it becomes impossible to taken in the light ray, resulting in a decrease in efficiency.

Accordingly, the area of the entrance/exit surfaces 002, 003 is preferably adjusted to be substantially equivalent to the size of the entering light ray, or set to be twofold at most in consideration of assembly tolerances.

The width W and height H of the entrance/exit surfaces 002, 003 are defined as being such that width W>height H. In this case, it may be preferable to make the length L greater than three times the width W.

A conventional area light source has a Lambertian distribution with a half width at half maximum of 60°. When the refractive index of a general transparent material is 1.5, according to Snell's law, it can be considered that the luminous flux that has been taken into the optical integrator 001 will be distributed in a ±35° range. A light ray of 35°, as it propagates along a length L which is three times the width W, would be reflected approximately twice. That is, the following expression (1) would be satisfied:

$$L \times \tan 35° \geq 2 \times W \quad (1)$$

If the length is such as to enable the approximately two times of reflection, color mixing property and homogeneity can be satisfied by adjusting the loading rate of the scattering particles 008.

When set to a length L which is more than three times the width W, it becomes possible to maintain efficiency by making an adjustment to reduce the loading rate, while color mixing property and homogeneity are satisfied.

For example, when the width W and height H are those of a 1 mm square, if the length is 4 mm, the diameter of the scattering particles 008 is approximately 2 µm, the first refractive index is 1.48, and the second refractive index is 1.58, the total volume of the second medium of the scattering particles 008 may be set in a range of 0.5% to 1.0% with respect to the total volume of the first medium.

It may be desirable that the entrance/exit surfaces 002, 003 be substantially parallel with each other. This is desirable in terms of efficiency as it enables light entrance/exit while an average angle of perpendicularly entering light is maintained.

It may be desirable that the entrance/exit surfaces 002, 003 have the same shape. Leakage of light on the TIR side surface can be decreased, and efficient reflection can occur on the TIR side surface, whereby loss can be decreased.

The loading rate of the scattering particles 008 is inversely proportional to the mean free path which is a mean distance of collision of light and the scattering particles 008. Accordingly, the light transmittance, which decreases by the number of times of collision of light and the scattering particles, can be said to be proportional to the mean free path. That is, the loading rate of the scattering particles 008 is inversely proportional to the brightness. Because efficiency is decreased by excessive filling of the scattering particles 008, the loading rate of the scattering particles 008 may be determined in consideration of color mixing property, homogeneity, and efficiency.

It may be desirable that the TIR side surface have a reduced surface roughness. By reducing the surface roughness of the TIR side surface, leakage light from the reflecting side surface can be decreased, whereby high light-quantity output can be obtained.

It may be desirable that the surface roughness in the length direction be made smaller than that in a direction perpendicular to the length direction. This is because, while anisotropic roughness tends to be caused by the processing methods and the like (cutting and molding), decreasing the surface roughness in the optical axis direction makes it possible to decrease leakage light from the reflecting side surface, whereby high light-quantity output can be obtained.

The entrance/exit side surfaces 002, 003 may have increased surface roughness. In this case, the roughened entrance/exit surfaces make it possible to equalize the light produced by surface scattering.

The optical integrator of the present invention is not particularly limited as long as the optical integrator has the structure of being loaded with the first medium and the scattering particles (second medium) that have a different refractive index from the first medium and that scatter the propagating light. The optical integrator can be easily obtained using the materials and manufacturing method described below.

<First Medium>

First, as the material of the first medium, a material with high transparency is selected from the viewpoint of light propagation. While in the present example an acrylic photocuring resin is used, the material is not particularly limited as long as the material has high transparency. For example, an epoxy-based thermosetting resin, acrylic or polycarbonate thermoplastic resins, glass and the like may be used.

Preferably, a photocuring resin may be used from the viewpoint of: easy mixing with the second medium when a solid second medium may be used; increased work efficiency due to the absence of the need for the steps of cooling, drying, and the like after curing; and the ease with which the optical integrator of a predetermined shape can be obtained. Preferably, an acrylic material may be used as it makes it possible to increase transmittance and light utilization efficiency.

<Second Medium>

The second medium can be efficiently obtained by mixing in the first medium particles having a different refractive index from that of the first medium. As the material for the second medium, in the present example, cross-linked polystyrene fine particles are used. However, other materials may be used, such as plastic particles, glass particles and the like, as long as the material has high transparency.

However, in order to scatter light, it is important that there be a refractive index difference. Accordingly, it may be desirable that there be a refractive index difference of not less than 0.005 between the first medium and the second medium. More preferably, the difference may be not less than 0.005 and not more than 0.015 from the viewpoint of: the ease with which the specific gravity of the first medium and the specific gravity of the second medium can be made to be close to each other, whereby the second medium can be easily mixed with the first medium; and the ease with which the scattering effect can be obtained while suppressing a decrease in efficiency. In this case, when the refractive indexes of the first medium and the second medium are compared, the refractive index of one or the other may be greater. In the present invention, the refractive index difference refers to the value calculated from the difference between, of the first medium and the second medium, the higher of the refractive indexes of the first medium and the second medium and the lower of the refractive indexes of the second medium and the first medium.

<Particle Size>

It may be desirable that the particle size of the second medium be not less than 0.5 μm and not more than 5 μm. This is because, as mentioned above, if the particle size is too small, there will be excessive scattering of light and the light extraction efficiency will be decreased, while if the particle size is too large, it will become difficult to scatter light. While it may be desirable that the particle size be substantially uniform, the effect can be obtained without any problems as long as 90% or more of the particles are within the particle size range.

<Manufacturing Method>

The first medium and the second medium may be integrated by, for example, a method whereby the first medium in liquid form is prepared, the first medium and the second medium are mixed, and the mixture is fabricated into a predetermined shape by photocuring. Other fabrication methods, such as heat pressing, injection molding, or shaving, may be used. Among others, use of the first medium in liquid form may be more preferable as it enables easy mixing of the second medium. It may be even more preferable if the mixture of the first medium and the second medium is also in liquid state, as this will facilitate the processing into a predetermined shape.

At the time of creating a product shape, a board with a product height may be fabricated and then the outer periphery of the board may be cut to the product size. Alternatively, a mold having a space corresponding to the product size may be fabricated, and resin may be poured into the mold and cured.

<Surface Roughness>

In the present example, it may be desirable that the surface roughness (Ra: arithmetic mean roughness) of the optical integrator be decreased in the length direction of the side surface. This is because if the side surface is roughened in the length direction, the light that has impinged on the side surface may exceed the critical angle and exit through the side surface. In a direction perpendicular to the length direction, the surface may be roughened to the extent that the propagation of light would not be adversely affected. With regard to the light entrance surface and light exit surface, the effect of increased diffusion of light can be expected, so that the surfaces may be roughened to the extent that the emission of light would not be adversely affected. In view of the above, the surface roughness in the optical axis direction of the side surface may be more than 0 μm and not more than 2.0 μm; more preferably more than 0 μm and not more than 1.0 μm; and even more preferably more than 0 μm and not more than 0.5 μm. The surface roughness of the light entrance surface and light exit surface may be not less than the surface roughness of the side surface; preferably 0.01 μm to 10 μm; more preferably 0.5 μm to 5 μm; and even more preferably 0.5 μm to 3 μm. Preferably, the surface roughness in the direction perpendicular to the optical axis of the side surface may be more than 0 82 m, with the upper limit being not more than the values listed above with reference to the surface roughness of the light entrance surface and light exit surface.

Preferably, the surface roughness in the direction perpendicular to the optical axis in the side surface (direction of the length L in the drawing) is smaller in the aforementioned ranges. However, the surface roughness may be selected as desired from the viewpoint of processing efficiency. Specifically, when the side surface is formed by cutting, for example, of the surface roughness in the cutting direction and the surface roughness in a direction substantially perpendicular to the cutting direction, the surface roughness in the former cutting direction tends to become smaller. If, in order to increase processing efficiency, the cutting speed and the like are changed, particularly the surface roughness in the direction substantially perpendicular to the cutting direction becomes rougher. In this case, by aligning the cutting direction with the optical axis direction, it becomes possible to retain the light propagation efficiency while maintaining work efficiency. When molding and the like is utilized, and where the mold for molding has surface roughness directionality, such as a cutting trace, the surface roughness may be transferred onto the optical integrator. In this case, too, by aligning the optical axis direction with a direction having smaller surface roughness, satisfactory light propagation efficiency can be retained.

When solid particles are used in the second medium, if there is the presence of irregularities having protrusions due to the scattering particles of the second medium protruding from the side surface, and/or recesses due to the traces of the scattering particles having fallen from the side surface, to such an extent as to contribute to the surface roughness, this may provide a cause of leakage of light from the side surface, as described above. Accordingly, the surface roughness (Ra) of the side surface may preferably be not more than ½ the average particle size of the scattering particles introduced as the second medium. This may be achieved by a state in which there is no protrusion of the scattering particles from the side surface of the optical integrator, or by smoothing the side surface by removing the protruding scattering particles by polishing or cutting, for example.

Figure 2:
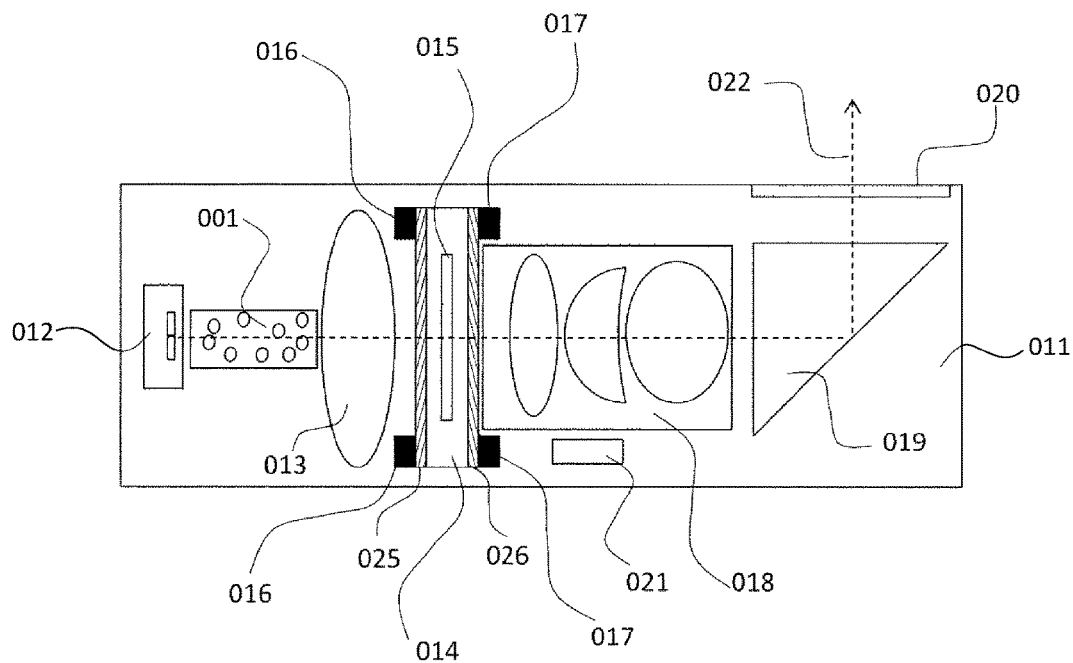
FIG. 2 is a schematic diagram of a picture projection device 011.

With reference to FIG. 2, a picture projection device 011 in which the optical integrator 001 is used will be described.

FIG. 2 is a schematic diagram of the picture projection device 011.

The picture projection device 011 illustrated in FIG. 2 includes a light source 012, the optical integrator 001, an illumination lens 013, a polarization filter 025, a micro display 014, a lens unit 018, an optical axis modification element 019, an exit window 020, and a light detection unit 021. A light travel path 022 indicated by a broken line is a phantom line which is drawn to aid the description of light ray propagation.

The light source 012 is a multi-chip light source equipped with chips that output red, green, and blue wavelength bands of light. For the light source 012, generally available inexpensive LEDs are contemplated.

The three colors of light rays that have exited the light source 012 enter the optical integrator 001, and are diffused by the above-described scattering particles and confined in the optical integrator 001, whereby high color mixing property and homogeneity are achieved.

The light that has exited the optical integrator 001 illuminates the micro display 014 via the illumination lens 013.

The light, before arriving at the micro display 014 from the illumination lens 013, propagates through the polarization filter 025, whereby light having linear polarization in a predetermined direction is selected.

The light having the predetermined direction polarization selected by the polarization filter 025 illuminates the micro display 014.

As the micro display 014, a transmitting type of liquid crystal element having no color filter is contemplated. Accordingly, compared with a liquid crystal having a color filter, the pixels can be made ⅓, so that a high resolution picture can be achieved. The micro display 014 has a display area 015 which indicates the region in which a picture is generated. Color creation is achieved by the FSC technology whereby the red, green, and blue wavelength bands of light in the light source 012 are lit at respective times.

The display area 015 has the function of selecting a perpendicular direction or a parallel direction with respect to the predetermined polarization on a pixel by pixel basis. For a valid picture, polarization parallel with the direction selected by the polarization filter 025 is selected.

The light ray valid as a picture and the invalid light ray that propagate through the display area 015 enter the polarization filter 026. In the polarization filter 026, only the light ray of valid polarization as a picture is passed, and the light ray of invalid polarization is absorbed or reflected.

Only the light ray valid as a picture in the polarization filter 026 propagates to the lens unit 018.

Light shield openings 016, 017 are light shield openings that are arranged so as to prevent exit of unwanted light rays outside the display area 015.

The lens unit 018 is a projecting lens including a plurality of lenses, and has the function of enlarging and focusing the picture in the display area 015 on a screen (not illustrated).

While in the drawing a set of three lenses is illustrated, the number of the lenses may be increased or decreased depending on the enlarging ratio of the picture to be projected or the projecting distance.

It may be desirable that the lens unit 018 be provided with a mechanism for enabling movement away from and toward the micro display 014. The mechanism makes it possible to provide a focus function for changing the picture focus position in accordance with the projecting distance.

The light that has passed through the lens unit 018 is reflected by the optical axis modification element 019, and projected onto the screen (not illustrated) via the exit window 020.

The optical axis modification element 019 has the function of bending the picture. The function may be achieved by means of a prism as illustrated, a simple reflecting mirror or the like. It may be desirable that surface accuracy of the surfaces through which the light ray passes be ensured so as not to warp the picture.

The exit window 020 has the function of preventing the entry of dust, water drops and the like from the outside. The exit window comprises an optically transparent flat plate, and it may be desirable that the plate has an anti-reflection film for the red to blue regions (a wavelength range of 430 nm to 670 nm) formed thereon for reducing efficiency loss.

The picture projection device 011 is also equipped with the light detection unit 021 in order to be able to detect the light that has exited the light source 012. For example, as the light detection unit 021, a light detector with a color filter function for detecting each color of light is contemplated. For FSC control, the light detection unit 021 may employ a light detector having no wavelength dependency. In this case, light detector signals may be monitored in synchronism with the timing of successive emissions of red, green, and blue by the FSC. In this case, the cost of the light detection unit 021 may be reduced by employing a light detector having a color filter function.

In a desirable configuration, the light detection unit 021 may store the initial values of the light output by the light source 012 set for predetermined color temperature and brightness, so that feedback control can be implemented when the light quantity is changed by, e.g., temperature or degradation over time.

Figure 3:
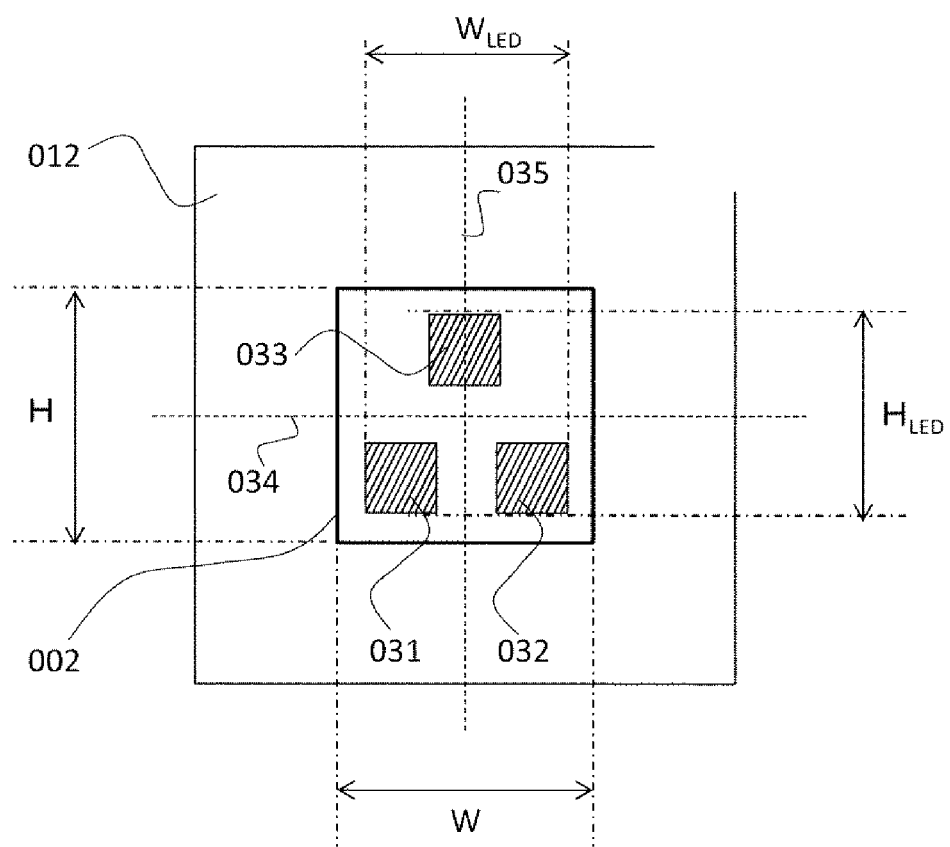
FIG. 3 is a diagram illustrating the arrangement of a light source 012 and the optical integrator 001.

With reference to FIG. 3, the arrangement of the light source 012 and the optical integrator 001 will be described. The light source 012 is a multi-chip light source equipped, in a single housing, with a red chip 031, a green chip 032, and a blue chip 033 for outputting red, green, and blue wavelength bands of light.

The red, green, and blue wavelength bands of light output from the light source 012 enter the entrance/exit surface 002 (or the entrance/exit surface 003) of the optical integrator 001. The width W and height H of the entrance/exit surface 002 of the optical integrator 001 are set greater than the width $W_{LED}$ and height $H_{LED}$ of the maximum outer shape of the red chip 031, green chip 032, and blue chip 033 mounted in the light source 012. In addition, it is preferable to align the center of the red chip 031, green chip 032, and blue chip 033 with the center of the entrance/exit surface 002 according to design (the point of intersection of lines 034, 035 in the drawing). For example, when the width $W_{LED}$ and height $H_{LED}$ are each 1 mm and the mounting tolerance is ±0.05 mm, the width W and height H are preferably set to be approximately 1.1 mm.

Figure 4A:
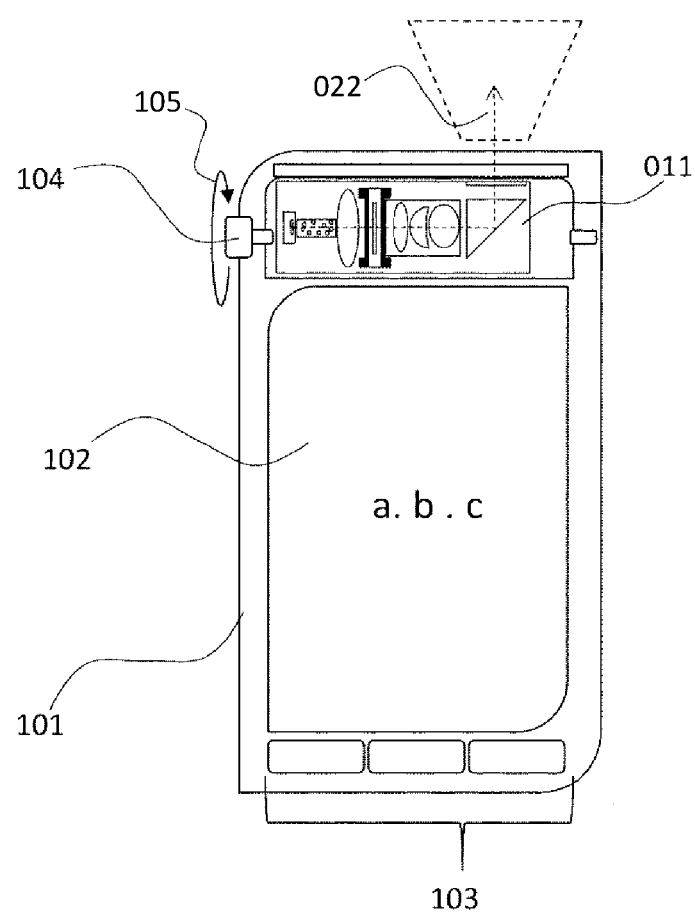
FIG. 4A is a schematic diagram of a display device 101.
Figure 4B:
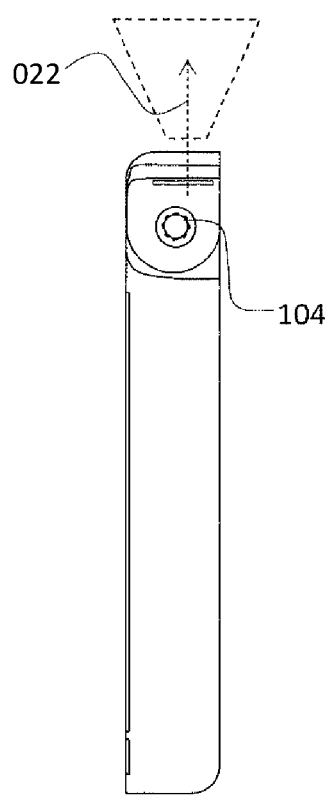
FIG. 4B is a schematic diagram of the display device 101.
Figure 4C:
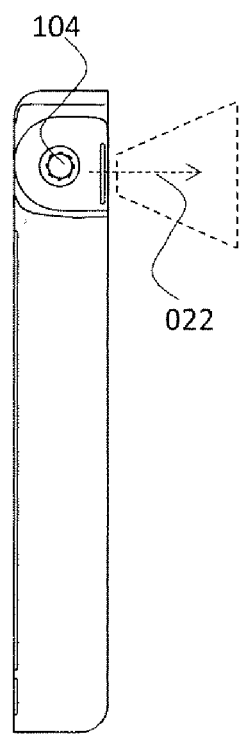
FIG. 4C is a schematic diagram of the display device 101.

With reference to FIG. 4A to FIG. 4C, a display device 101 employing the picture projection device 011 will be described.

FIG. 4A to FIG. 4C are schematic diagrams of the display device 101. FIG. 4A is a front view, and FIG. 4B and FIG. 4C are side views.

The display device 101, for which a smartphone, a tablet PC or the like is contemplated, includes a panel 102 for picture display and finger control of the display device 101 using electrostatic capacity, and control buttons 103. The picture projection device 011 is installed over the display device 101 in FIG. 4A to be able to project a picture in an upper direction in FIG. 4A.

The picture projection device 011 is also provided with a rotation mechanism 104 capable of rotating in the direction of arrow 105 in the display device 101, whereby the picture projected direction can be selected to be upward or rearward, as illustrated in the side views in FIG. 4B and FIG. 4C.

In order to realize such display device for mobile use, small size is required. In addition, high light utilization efficiency is required for a continuous use of the battery.

As mentioned above, in order to realize the picture projection device 011 which is small sized and highly efficient, there is a demand for a small optical integrator having increased color mixing property and homogeneity so as to enable a decrease in the size of the optical system of the picture projection device equipped with a multi-chip light source including a plurality of light sources mounted in a single housing.

Figure 5:
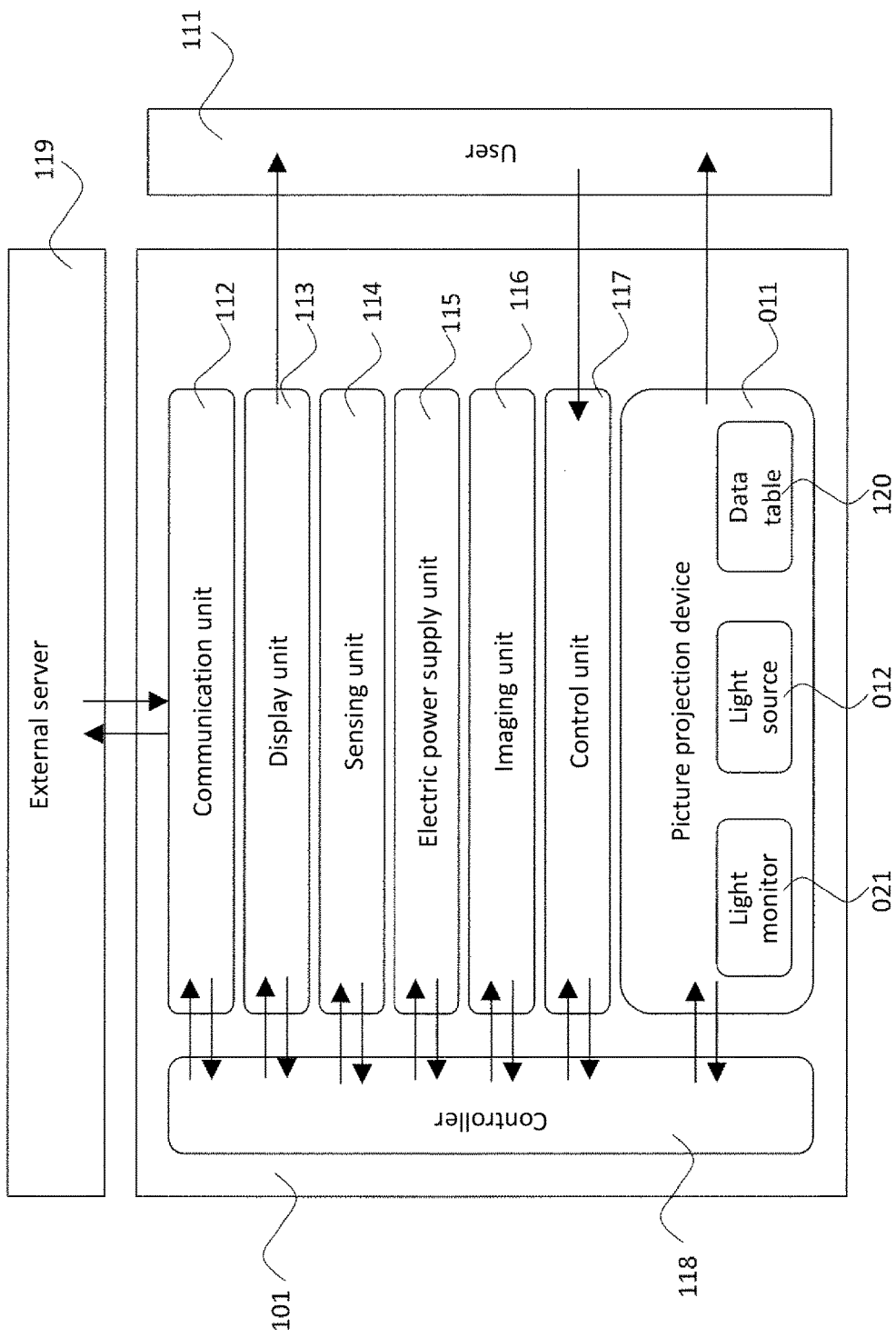
FIG. 5 is a schematic diagram of a system of the display device 101.

With reference to FIG. 5, a system of the display device 101 will be described.

FIG. 5 is a system block diagram of the display device 101.

The display device 101 is provided with the picture projection device 011 including a light monitor (light detection unit) 021, the light source 012, and a data table 120 in which setting values for light source control are stored.

The communication unit 112 has the function of acquiring external information by accessing information on the internet for WiFi or Bluetooth (registered trademark), or an external server 119, such as an electronic device possessed by a user 111.

The display device 101 is provided with a display unit 113 for displaying information to the user 111 via the panel 102, and a sensing unit 114 for sensing the external environment using, e.g., a GPS and an acceleration sensor that senses acceleration by the principle of an piezoelectric element or capacitance.

The display device 101 is also provided with an electric power supply unit 115 for supplying electric power from a battery and the like, and an imaging unit 116 for acquiring an outside world picture using a camera and the like.

The display device 101 is also provided with a control unit 117 for the user to control the display device 101 via voice recognition of words uttered by the user via a microphone, a touch sensor on the panel 102, buttons 103 and the like.

The display device 101 is also provided with a controller 118 which is a main chip for controlling the device and the various units in accordance with user control.

The display device 101 is provided with the picture projection device 011. Accordingly, not only the user 111 can observe a predetermined picture on the display unit 113 by himself, but also the user 111 and a plurality of other people can simultaneously observe the picture.

Accordingly, for example, the controller 118 may be provided with a function of detecting the location of the display device 101 based on the information acquired by the sensing unit 114, selecting surroundings information from the external server 119, driving the picture projection device 011, and displaying the selected information on the screen.

For example, the controller 118 may also be provided with a function such that an image data list kept by the user 111 is confirmed by the user 111 on the display unit 113, and the user 111 can then display only the selected image on the screen using the picture projection device 011, thereby enabling the user to let a plurality of other people to observe the picture.

For example, the controller 118 may also be provided with a function such that, when there is a small step and the like on a passageway on which the user 111 is walking, a picture signal acquired from picture information from the imaging unit 116 is processed by the controller 118, which, recognizing the presence of the step, provides the user 111 with information such as "Watch your step" by lighting the picture projection device 011.

The electric power supply unit 115 supplies necessary electric power to the devices via the controller 118. In this case, it may be desirable that the controller 118 be provided with a function for saving power by supplying electric power only to a device requiring power as needed.

It may be desirable that the controller 118 be provided with a function of monitoring light quantity information from the light detection unit 021 in the picture projection device 011, and controlling the output of the light source 012.

Figure 6A:
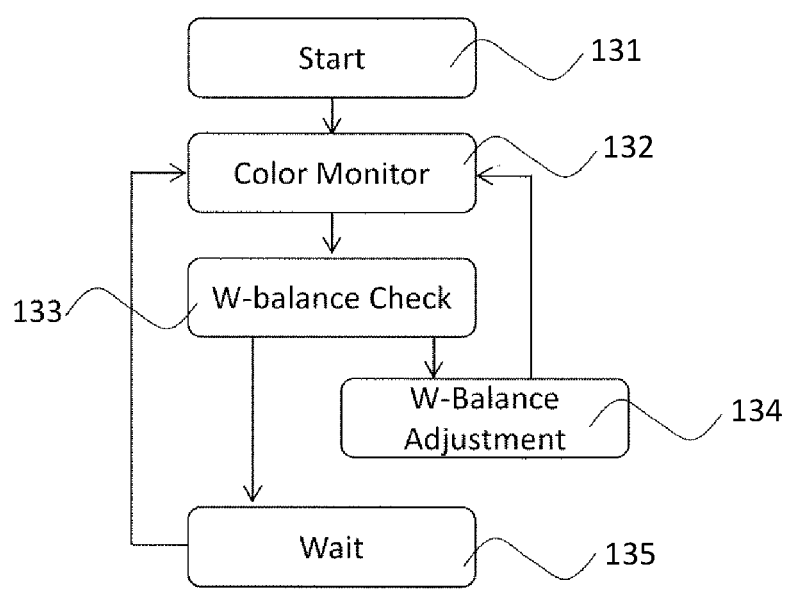
FIG. 6A is a diagram illustrating an adjustment flow of the display device 101.
Figure 6B:
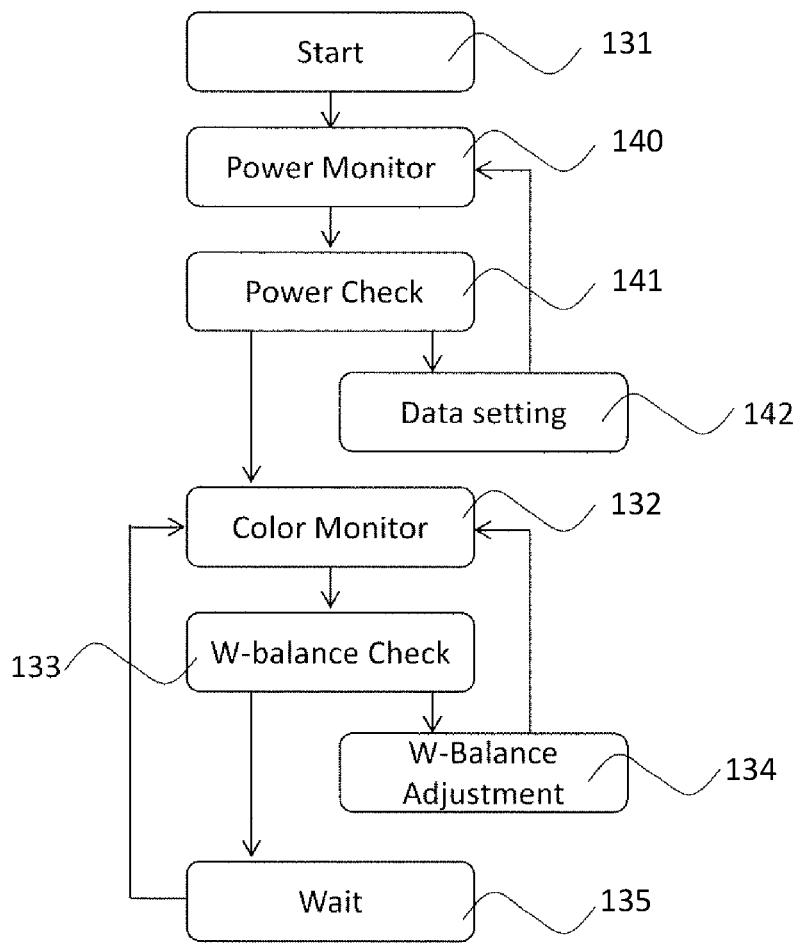
FIG. 6B is a diagram illustrating an adjustment flow of the display device 101.

With reference to FIG. 6A and FIG. 6B, an adjustment flow of the light source 012 of the display device 101 will be described.

At the time of initial value setting before shipping, light quantities I0(R), I0(G), and I0(B) for the red, green, and blue wavelength bands of the light source 012 are stored in the data table 120 so that the image output from the picture projection device 011 can have designated color coordinates.

Upon receiving a command from the controller 118 for projecting the picture of the picture projection device 011, the picture projection device 011 starts light emission from the light source 012 (131 in FIG. 6A). Then, the light detection unit 021 senses the light quantities I1(R), I1(G), and I1(B) of the light source 012 (132 in FIG. 6A). By comparing the sensed light quantities I1(R), I1(G), and I1(B) with the initial light quantities I0(R), I0(G), and I0(B), it is checked to see if there is an error from the designated color coordinates (133 in FIG. 6A).

As long as the picture projection device 011 is in operation, if there is no color coordinates error, the adjustment flow of sensing the light quantities (132 in FIG. 6A) using the light detection unit 021 is repeated after a predetermined time interval (135 in FIG. 6A).

A semiconductor light source such as an LED has the characteristics such that the output varies depending on temperature. Accordingly, due to changes in the environment temperature or heating of electronic circuitry disposed near the light source 012, for example, the optical output of the respective colors from the light source 012 may vary. If the output is varied, the light quantities of the red chip 031, green chip 032, and blue chip 033 in the light source 012 are controlled so as to correct the error (134 in FIG. 6A). The light quantity control may be performed by a method by which the drive current is changed, or a method by which emission time is changed, for example.

After the light quantity control adjustment is completed, the light quantities are again sensed (132 in FIG. 6A) to check if the predetermined colors are obtained (133 in FIG. 6A).

It is desirable that the picture projection device 011 thus implement feedback control so that the color coordinates do not exceed a certain range.

It is contemplated that the optical integrator 001 is made of resin. Accordingly, degradation may be caused over time or due to ultraviolet rays, resulting in a decrease in transmittance. It is also possible that the light source 012 may degrade over time and the emitted light quantity per se may be decreased.

To provide for such cases, brightness control may be implemented by a method as will be described below with reference to FIG. 6B.

Referring to FIG. 6B, in response to a command from the controller 118 to project a picture of the picture projection device 011, the picture projection device 011 starts light emission from the light source 012 (131 in FIG. 6B). Then, the light detection unit 021 senses light quantities I2(R), I2(G), and I2(B) of the light source 012 (140 in FIG. 6B). A sum value IT2 of the sensed light quantities I2(R), I2(G), and I2(B) and a sum value IT0 of the initial light quantities I0(R), I0(G), and I0(B) are compared with each other (141 in FIG. 6B).

If the light quantity difference is smaller than a predetermined setting value, it is assumed that either the light source 012 or the light detector has degraded, and the initial light quantity setting of the initial light quantities I0(R), I0(G), and I0(B) are modified to the light quantities I0(R), I0(G), and I0(B) in accordance with the ratio of IT2 to IT0, and the setting values in the data table 120 are updated (142 in FIG. 6B).

After the setting values are updated, the light quantities I2(R), I2(G), and I2(B) of the light source 012 are again sensed by the light detection unit 021 (140 in FIG. 6B). The sum value IT2 of the sensed light quantities I2(R), I2(G), and I2(B) and the sum value IT0 of the initial light quantities I0(R), I0(G), and I0(B) are compared with each other (141 in FIG. 6B). If it is confirmed that the light quantity difference is within the predetermined setting value range, light quantities I3(R), I3(G), and I3(B) are next sensed by the light detection unit 021 (132 in FIG. 6B). The sensed light quantities I3(R), I3(G), and I3(B) and the initial light quantities I0(R), I0(G), and I0(B) that have been reset are compared with each other, and it is checked to see if there is an error from the predetermined colors (133 in FIG. 6B).

As long as the picture projection device 011 is in operation, if there is no color coordinates error, the adjustment flow of sensing the light quantities using the light detection unit 021 (132 in FIG. 6B) is repeated after a predetermined time interval (135 in FIG. 6B).

If there is a light quantity output error, the light quantities of the red chip 031, green chip 032, and blue chip 033 in the light source 012 are controlled so as to correct the error (134 in FIG. 6B).

After the light quantity control adjustment is completed, the light quantities are again sensed (132 in FIG. 6B) to see if the predetermined color coordinates are obtained (133 in FIG. 6B).

By also monitoring the brightness as described above, it becomes possible to avoid the problem of inability to adjust the color coordinates due to a decrease in brightness caused by degradation over time.

As illustrated in FIG. 6B, the variation in brightness due to degradation over time can be corrected by checking only at the time of starting up. Accordingly, at times other than the start-up time, the flow of 132 to 135 in FIG. 6B may be repeatedly controlled.

EXAMPLE 2

A second example of the present invention will be described with reference to the drawings.

In the present example, a modification of the optical integrator 001 will be described.

Figure 7:
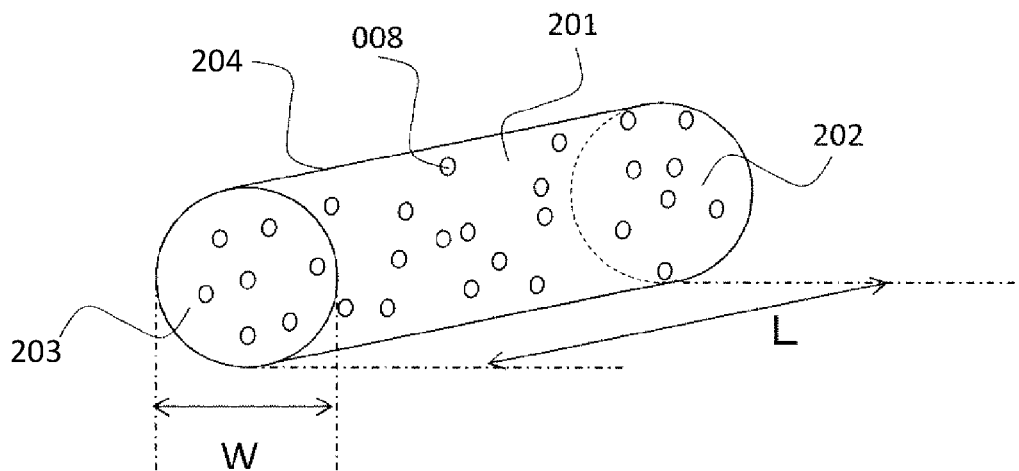
FIG. 7 is a diagram of an optical integrator 201.

Initially referring to FIG. 7, an optical integrator 201 will be described.

The optical integrator 201 is an example in which the shape of the optical integrator 001 of FIG. 1 is changed from prismatic rectangular to cylindrical. The optical integrator 201 has a cylindrical shape with a length L and a diameter W, and is internally filled with a first medium having a predetermined high transparency and a first refractive index N1.

The optical integrator 201 also includes entrance/exit surfaces 202, 203 and a TIR side surface 204.

In the optical integrator 201, scattering particles 008 filled with a highly transparent second medium having a second refractive index different from the first medium are randomly loaded. As in the optical integrator 001, the optical integrator 201 has the function of scattering by modifying the angle of the propagating light rays.

Conventionally, it is known that in a rod-type optical integrator, if a cylindrical shape is adopted, satisfactory homogeneity cannot be obtained because of differences caused in propagation distance. In contrast, because the optical integrator 201 is internally provided with the scattering particles 008, color mixing property and homogeneity can be obtained without problems even though a cylindrical shape is adopted.

For example, a manufacturing method involving drawing, as in the case of fiber, can be implemented, thereby providing a cost advantage.

It may be desirable that the diameter W of the entrance/exit surfaces 202, 003 be set greater than the area of the entering light ray and not greater than twice the area, in consideration of mounting tolerances and the like. This is because, as described above, luminance is inversely proportional to area.

Figure 8:
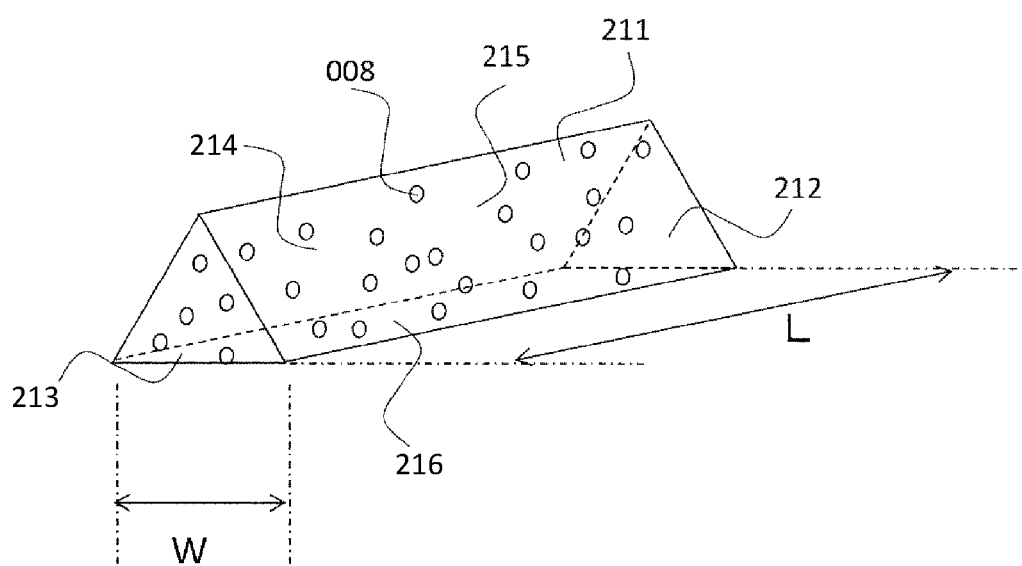
FIG. 8 is a diagram of an optical integrator 211.

With reference to FIG. 8, an optical integrator 211 will be described.

The optical integrator 211 is an example in which the shape of the optical integrator 001 is changed from prismatic rectangular to triangular prism. The optical integrator 211 has a triangular prism shape with a length L and a side length W, and is internally filled with a first medium having a predetermined high transparency and a first refractive index N1.

The optical integrator 211 also includes entrance/exit surfaces 212, 213 and TIR side surfaces 214 to 216.

In the optical integrator 211, scattering particles 008 filled with a highly transparent second medium having a second refractive index different from the first medium are randomly loaded. As in the optical integrator 001, the optical integrator 211 has the function of scattering by modifying the angle of the propagating light ray.

In accordance with the triangular shape formed by the red chip 031, green chip 032, and blue chip 033 in the light source 012, as illustrated in FIG. 3, a triangular prism shape is adopted.

It may be desirable that the length W of the entrance/exit surfaces 212, 213 be set greater than the area of the entering light ray and not greater than twice the area, in consideration of mounting tolerances and the like. This is because, as described above, luminance is inversely proportional to area.

The optical integrator 211, in which wasteful space is made smaller than in the case of the prismatic rectangular shape when combined with the triangular light source 012, provides the effect of increasing efficiency while color mixing property and homogeneity are ensured.

Figure 9:
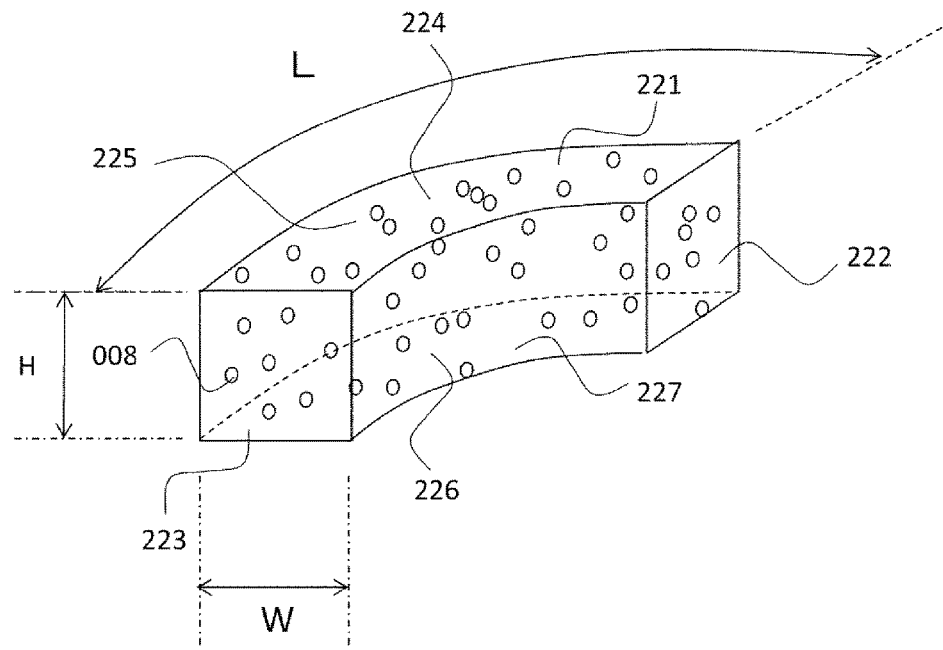
FIG. 9 is a diagram of an optical integrator 221.

With reference to FIG. 9, an optical integrator 221 will be described.

The optical integrator 221 is an example in which the shape of the optical integrator 001 is changed to a curved shape. The optical integrator 221 has a curved shape with a longitudinal length L, a width W, and a height H, and is internally filled with a first medium having a predetermined high transparency and a first refractive index N1.

The optical integrator 221 also includes entrance/exit surfaces 222, 223 and TIR side surfaces 224 to 227.

In the optical integrator 221, scattering particles 008 filled with a highly transparent second medium having a second refractive index different from the first medium are randomly loaded. As in the optical integrator 001, the optical integrator 221 has the function of scattering by modifying the angle of the propagating light ray.

The optical integrator 221 is characterized in that the entrance/exit surfaces 222 and 223 have different normal lines, thereby making it possible, when mounted, to easily bend the interval between the light source 012 and the illumination lens 013.

There can be obtained the effect of ensuring color mixing property and homogeneity and increasing the mounting and design freedom.

Figure 10:
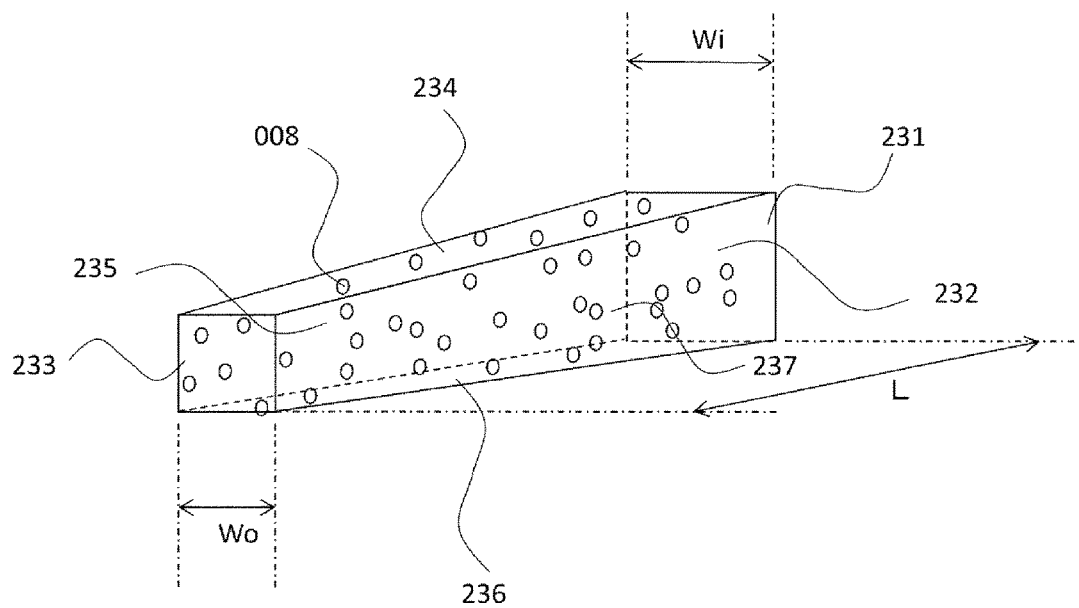
FIG. 10 is a diagram of an optical integrator 231.

With reference to FIG. 10, an optical integrator 231 will be described.

The optical integrator 231 is an example in which the ratio of the entrance/exit surfaces of the optical integrator 001 is modified.

The optical integrator 231 includes an entrance surface 232, an exit surface 233, and TIR side surfaces 234 to 237, and is internally filled with a first medium having a predetermined high transparency and a first refractive index N1. The entrance surface 232 is a square with a width Wi, and the exit surface 233 is a square with a width W0. The optical integrator 231 has a length L and is characterized in that the entrance surface 232 and the exit surface 233 have different sizes.

In the optical integrator 231, scattering particles 008 filled with a highly transparent second medium having a different second refractive index from the first medium are randomly loaded. As in the optical integrator 001, the optical integrator 231 has the function of scattering by modifying the angle of the propagating light ray.

With regard to the light quantity per solid angle, according to the relationship of etendue which is a physical law of conservation, higher efficiency can be obtained by a smaller light source and a larger display area. In the optical integrator 231, the sizes of the entrance surface 232 and the exit surface 233 are made different, the entrance surface 232 is disposed on the light source 012 side, and the exit surface 233 is disposed on the illumination lens 013 side. In this arrangement, the transmission efficiency from the illumination lens 013 to the display area 015 can be increased.

With reference to FIG. 11A to FIG. 11D, chip arrangements of the multi-chip light source, the relationship of the entrance/exit surfaces of the optical integrator, and modifications will be described.

Figure 11A:
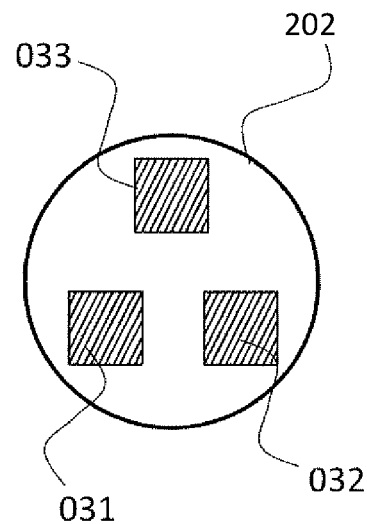
FIG. 11A is a diagram illustrating the arrangement of a light source and an optical integrator.
Figure 11B:
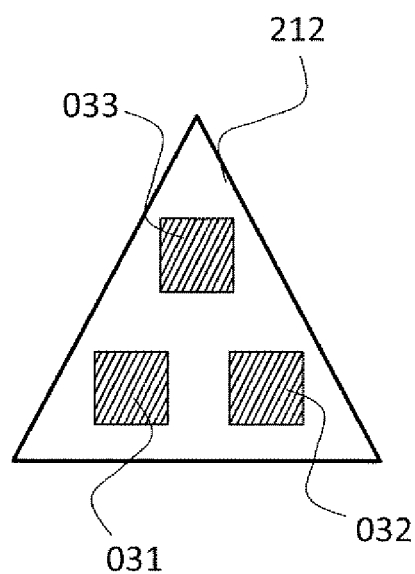
FIG. 11B is a diagram illustrating the arrangement of a light source and an optical integrator.
Figure 11C:
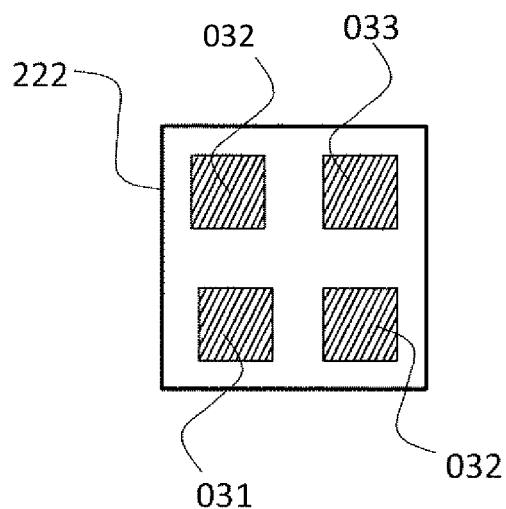
FIG. 11C is a diagram illustrating the arrangement of a light source and an optical integrator.
Figure 11D:
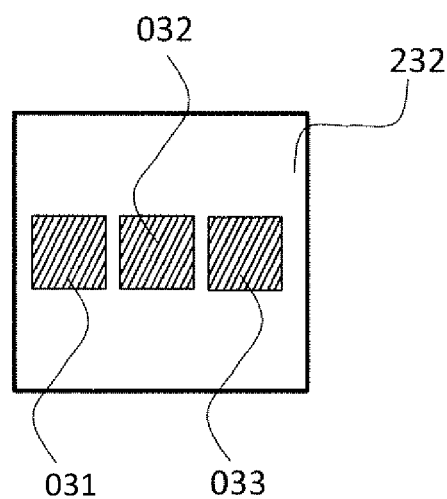
FIG. 11D is a diagram illustrating the arrangement of a light source and an optical integrator.

FIG. 11A illustrates an example in which the optical integrator 201 is used; FIG. 11B illustrates an example in which the entrance/exit surfaces 212 of the optical integrator 211 are used; FIG. 11C illustrates an example in which the entrance/exit surfaces 222 of the optical integrator 221 are used; and FIG. 11D illustrates an example in which the entrance surface 232 of the optical integrator 231 is used.

In the cylindrical optical integrator 201, the red chip 031, green chip 032, and blue chip 033 may be arranged in a triangle in the entrance/exit surface 202. The arrangement reduces loss and is advantageous in terms of efficiency. Similarly, in the optical integrator 211, a triangular arrangement may be adopted in the entrance/exit surface 212. The arrangement reduces loss and is advantageous in terms of efficiency.

In the case of the rectangular entrance/exit surface 222 of the optical integrator 221, the red chip 031, two green chips 032, and the blue chip 033 for a total of four chips can be arranged. In this case, by increasing the number of the green chips, which appear bright to the human eye, the effect of increased brightness can be expected.

In the case of the rectangular entrance surface 232 of the optical integrator 231, for example, the red chip 031, green chip 032, and blue chip 033 may be arranged in a row. Currently available multi-chip light sources having three colors of chips mounted therein include those with a triangular arrangement as described above and those with a single-row arrangement, for example. In the case of the single-row arrangement as illustrated in FIG. 11D, color mixing property and homogeneity can be ensured by making the size of the entrance surface 232 equal to or greater than the outer-most shape of the chips. That is, regardless of the chip arrangement, color mixing property and homogeneity can be ensured by making the area of the entrance/exit surface equal to or greater than the outer-most shape of the chips.

When importance is to be placed on efficiency, it may be desirable to make the shape of the entrance surface 232 rectangular in accordance with the chip arrangement, as illustrated in FIG. 11D, rather than square.

EXAMPLE 3

A third example of the present invention will be described with reference to the drawings.

In the present example, a modification of the picture projection device 011 will be described.

Figure 12:
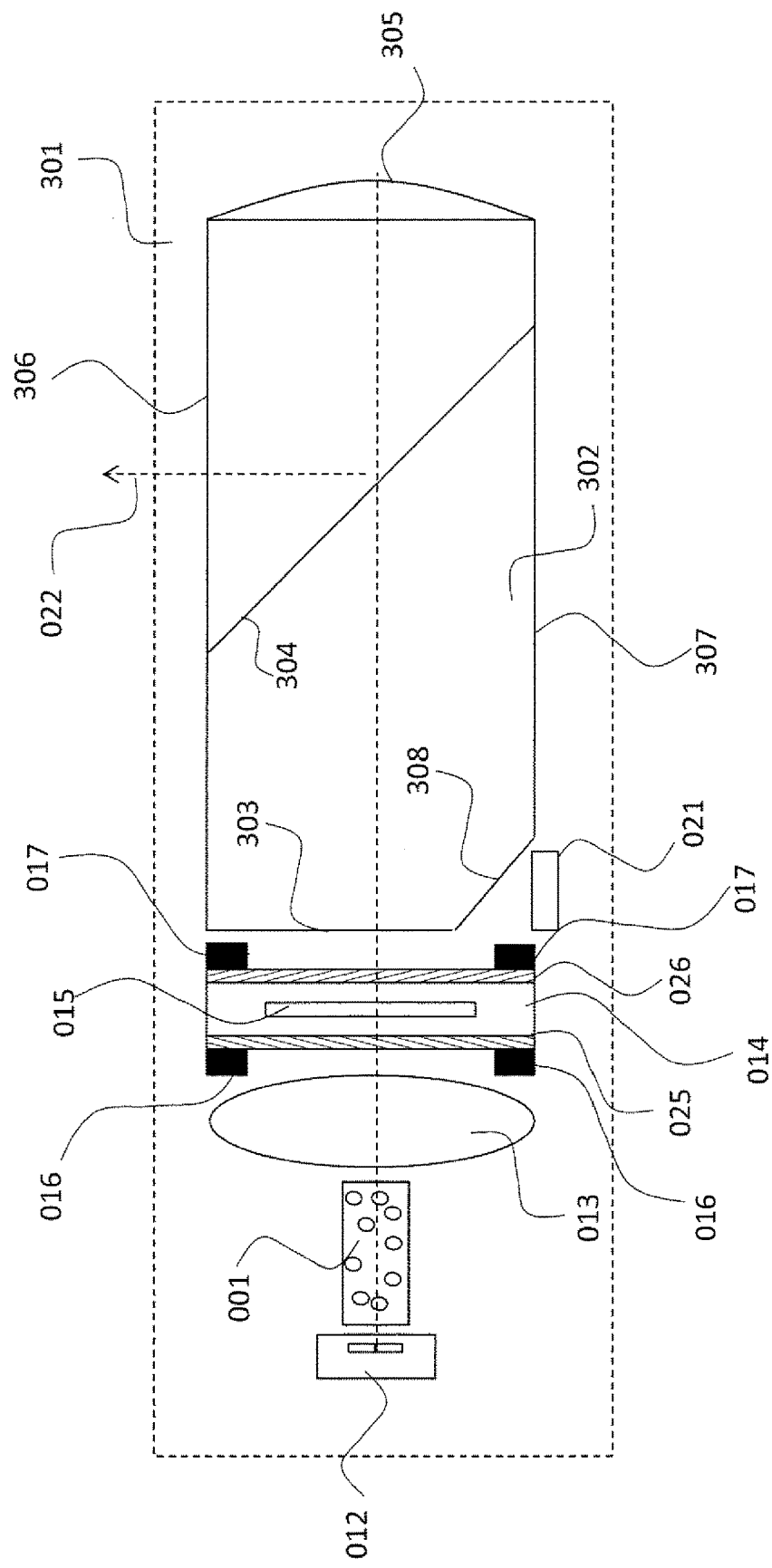
FIG. 12 is a schematic diagram of a picture projection device 301.

FIG. 12 is a schematic diagram of a picture projection device 301. The picture projection device 301 comprises an optical system in which a virtual image system for projecting a picture directly onto the eye, such as for head mount display, is adopted.

The picture projection device 301 illustrated in FIG. 12 differs from the picture projection device 011 of FIG. 2 in that a different lens unit 302 is installed.

The lens unit 302 has an entrance surface 303, a beam split surface 304, a reflecting lens 305, an exit surface 306, a transmitting surface 307, and a reflecting surface 308.

The entrance surface 303, the exit surface 306, and the transmitting surface 307 are transparent planes. The beam split surface is provided with an optical branching function for passing predetermined light and reflecting the rest. The optical branching function may be achieved using a dielectric multilayer film.

The face of the reflecting lens surface 305 is a reflecting-coated lens face. In the drawing, the eye is located above in the direction of the arrow 022 indicating the light travel path. A distance L from the eye to the picture can be roughly calculated from a focal point distance F of the reflecting lens surface 305, and an optical distance A from the display area 015 to the reflecting lens surface, according to a general lens equation indicated by the following expression (2). The distance L characteristically has a negative sign because of the virtual image.

$$1/F=1/A+1/L$$ Expression (2)

The reflecting surface 308 is a reflecting surface provided so that light can propagate to the light detection unit 021. Generally, the reflecting lens surface 305 and the reflecting surface 308, for example, may be provided using a dielectric multilayer film, or a metal coating of aluminum, silver alloy and the like.

Only the light ray that is valid as a picture in the polarization filter 026 propagates to the entrance surface 303 of the lens unit 302. The light ray that has passed through the entrance surface 303 propagates to the beam split surface 304. Part of the light is transmitted by the beam split surface and reaches the reflecting lens surface 305. The light ray is provided with a lens effect by the reflecting lens surface, reflected, and again reaches the beam split surface 304. Part of the light is reflected by the beam split surface 304 and directly projected onto the eye via the exit surface 306.

In a virtual image system, a person recognizes a picture in combination with the lens function of the eye. Compared with the real image where a picture projected by, e.g., a conventional projector, on a screen is viewed, a picture is generated on a virtual screen combined with the lens function of the human eye; hence the term "virtual image".

In the case of the head mount display, because the picture is directly projected onto the eye, the outside world is viewable to the eye only through the lens unit 032. In order to ensure the see-through property indicating the ease with which the outside world can be seen, it may be desirable that the exit surface 306 and the transmitting surface 307 be highly optically transparent surfaces.

As described above, in the picture projection device 301, by being equipped with the lens unit 302 and the optical integrator 001, a small optical system in which a virtual image system for head mount display is adopted can be realized.

Figure 13:
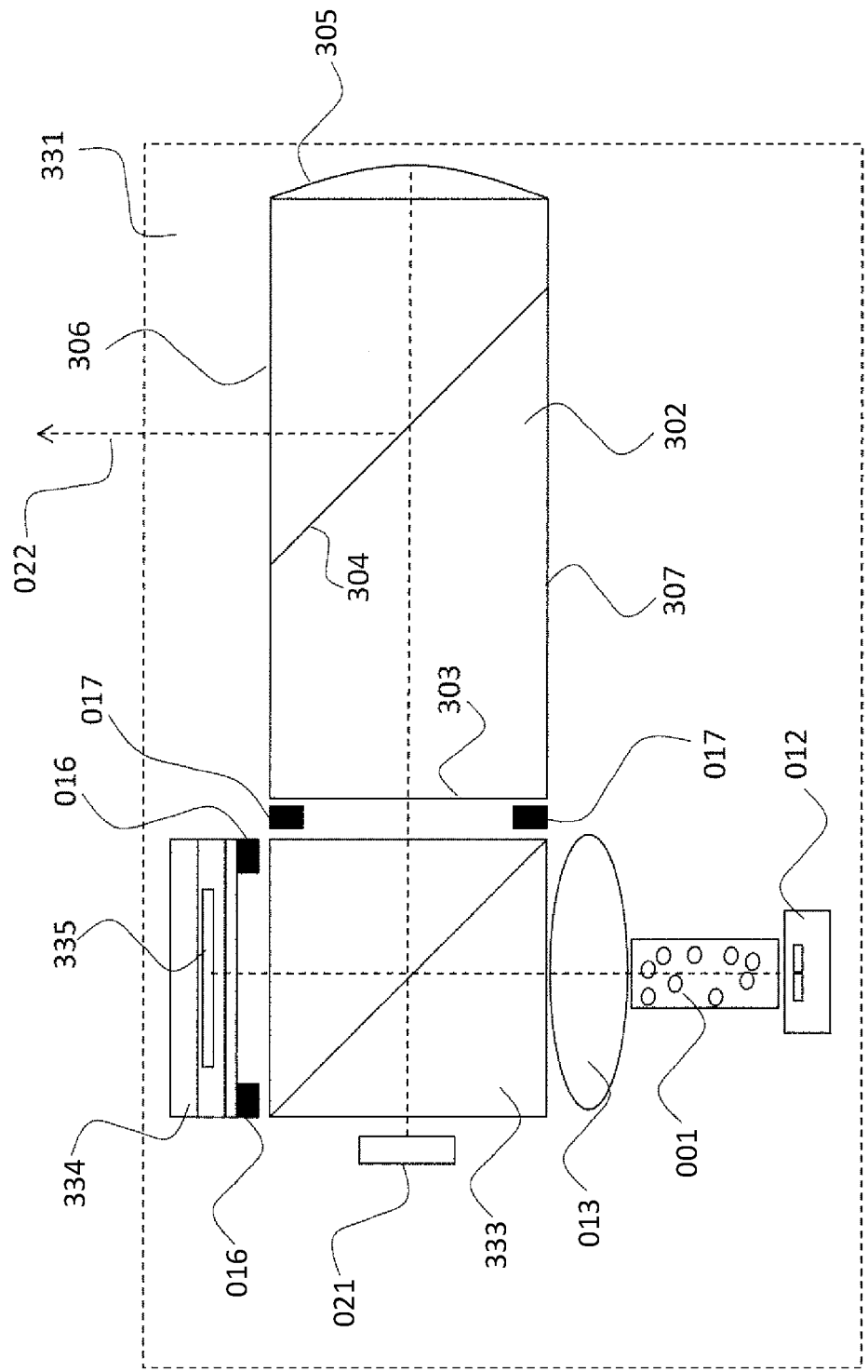
FIG. 13 is a schematic diagram of a picture projection device 331.

FIG. 13 is a schematic diagram of a picture projection device 331. The picture projection device 331 is a modification of the picture projection device 301, and comprises an optical system in which a virtual image system for projecting a picture directly onto the eye for head mount display, for example, is adopted.

The picture projection device 331 illustrated in FIG. 2 is equipped with a picture generation device 334 different from that of the picture projection device 301. As the picture generation device 334, a reflecting-type liquid crystal element is being contemplated.

The light that has exited the illumination lens 013 enters a polarization beam splitter 333. The polarization beam splitter 333 is a conventional optical element that reflects a predetermined polarization and transmits a polarization perpendicular to the predetermined polarization.

The light ray reflected by the polarization beam splitter 333 propagates to the light detection unit 021 and is used for monitoring light quantity. The light that has been transmitted by the polarization beam splitter 333 illuminates the picture generation device 334.

As the reflecting-type liquid crystal element, a liquid crystal having no color filter is being contemplated. Accordingly, the pixels can be made ⅓ compared with a liquid crystal having a color filter, so that a high resolution picture can be obtained. A display area 335 of the picture generation device 334 indicates a region in which a picture is generated. Color creation is achieved by FSC technology whereby the red, green, and blue wavelength bands of light in the light source 012 are lit at respective times.

The display area 335 has the function of selecting, on a pixel by pixel basis, a perpendicular direction or a parallel direction with respect to the predetermined polarization. For a valid picture, polarization in a direction parallel with the polarization reflected by the polarization beam splitter 333 is selected.

The light ray valid as a picture and invalid light ray reflected by the display area 335 again enter the polarization beam splitter 333, whereby only the light ray of polarization valid as a picture is reflected. The reflected light ray valid as a picture propagates to the lens unit 302, and is projected onto the eye as described above.

Light shield openings 016, 017 are light shield openings arranged so as to prevent the exit of unwanted light ray outside the display area 015.

Compared with a transmitting-type liquid crystal element, in the reflecting-type liquid crystal element, the thickness of the liquid crystal layer can be reduced, so that the polarization selection speed can be increased. Accordingly, the effect of reduced flickering, or so-called "color break", can be obtained.

A modification of the picture projection device 011 will be described.

Figure 14:
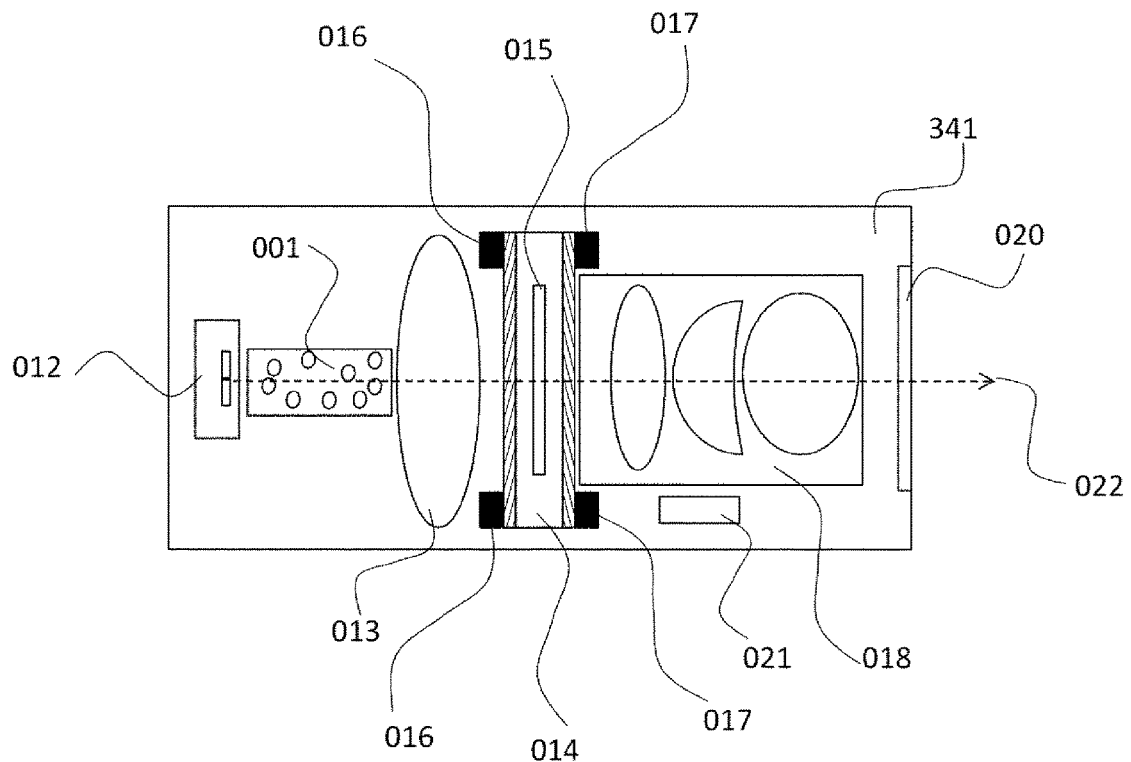
FIG. 14 is a schematic diagram of a picture projection device 341.

FIG. 14 is a schematic diagram of a picture projection device 341. The picture projection device 341 comprises an optical system for a real image used for projectors. The picture projection device 341 differs from the picture projection device 011 in that the optical axis modification element 019 is eliminated. The picture projection device 341 has a completely straight configuration from the light source 012. The elimination of the optical axis modification element 019 provides a cost advantage.

Figure 15A:
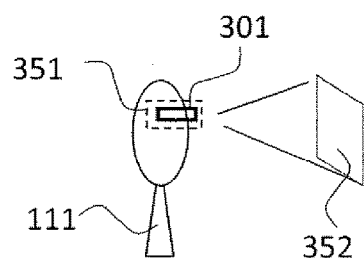
FIG. 15A is a schematic diagram of a display device.
Figure 15B:
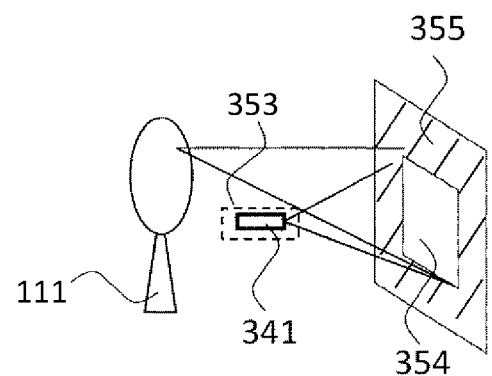
FIG. 15B is a schematic diagram of a display device.
Figure 15C:
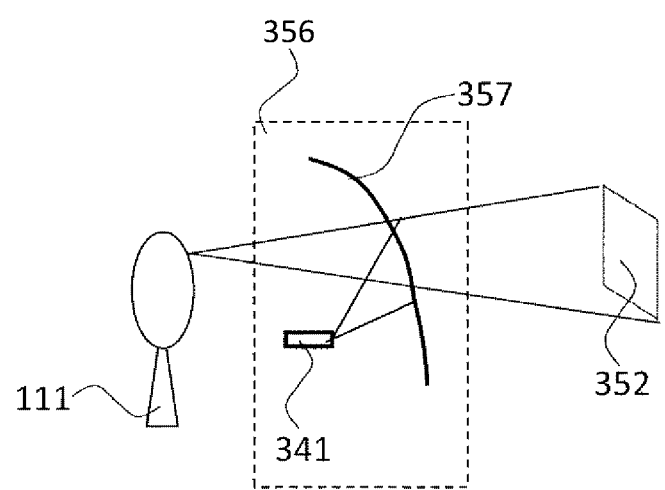
FIG. 15C is a schematic diagram of a display device.

With reference to FIG. 15A to FIG. 15C, a modification of the display device 101 will be described.

FIG. 15A a schematic diagram of a display device 351 in which the picture projection device 301 is used. FIG. 15B is a schematic diagram of a display device 353 in which the picture projection device 341 is used. FIG. 15C is a schematic diagram of a display device 356 in which the picture projection device 341 is used.

The display device 351 illustrated in FIG. 15A is a head mount display. The display device 351 is fitted on the head of the user 111, and a picture is projected from the picture projection device 301 in the display device 351 onto the eye of the user 111. The user visually recognizes a virtual image 352 as a picture which appears as if floating in the air.

The display device 353 illustrated in FIG. 15B is a pocket projector. From the picture projection device 341 mounted in the display device 353, a picture 354 is projected onto a screen 355. The user 111 visually recognizes the picture on the screen as a real image.

The display device 356 illustrated in FIG. 15C is a head-up display. From the picture projection device 341 mounted in the display device 356, a picture is projected onto a virtual image generation unit 357. The virtual image generation unit 357 has a beam splitter function of transmitting some of the light while reflecting the rest. The virtual image generation unit 357, having a curved surface structure, also has a lens function of generating a virtual image by projecting a picture directly onto the eye of the user 111.

The user 111 visually recognizes a virtual image 352 as a picture which appears as if floating in the air. Such head-up display is expected to be applied for a vehicle driver assist function, digital signage and the like.

In each of the display devices, small size and brightness are desirable. By using the optical integrator of the present invention, a small and bright picture projection device can be provided.

EXAMPLE 4

A fourth example of the present invention will be described.

The optical integrator 001 has a prismatic rectangular shape with a length of 4.15 mm, a height of 1.05 mm, and a width of 1.05 mm. The optical integrator 001 is internally filled with a highly transparent first medium with a refractive index of 1.49. In the optical integrator 001, scattering particles 008 filled with a highly transparent second medium with a refractive index of 1.59 are randomly loaded. The volume of the scattering particles is 0.5% with respect to the volume of the optical integrator 001. As the first medium, Hitaroid 9501 (trade name) manufactured by Hitachi Chemical Co., Ltd. is used. This is a urethane acrylate photocuring resin. As the second medium, Techpolymer SSX-302ABE (trade name) manufactured by Sekisui Plastics Co., Ltd. is used. This refers to fine particles made of a cross-linked polystyrene resin having a spherical shape with an average diameter of 2 μm, where approximately 95% of the entire particles are monodisperse particles having a difference of not more than 0.5 μm from the average diameter.

The optical integrator was manufactured as follows. First, 0.5% of fine particles with respect to the entire volume was put into the photocuring resin, and stirring was performed using a stirring rod for approximately 10 minutes. After stirring, sufficient degassing was performed by naturally standing for four hours or longer. The bottom surface and the side surfaces were enclosed by metal sheeting, thereby creating an air gap with a length of 50 mm, a width of 7 mm, and a depth of 1.05 mm, into which resin was poured and a glass plate was covered from above. At this time, care was taken not to allow the entry of air. Thereafter, UV lamp irradiation was performed via the glass so as to allow the resin to sufficiently cure. The product was then extracted and cut into a width of 1.05 mm and a length of 4.15 m, using a dicer (DAC552, manufactured by DISCO Corporation). When the side surfaces were processed with the dicer, the blade was fed in parallel with the length direction for processing. This was so that the processing trace by the dicer was produced along the length direction of the optical integrator, so as to reduce surface roughness in the optical axis direction of side surfaces and to reduce light leakage from the optical integrator. The side surfaces were processed using a dicing blade with particle size #5000, under the condition of a rotational speed of 30,000 rpm and a cutting speed of 0.5 mm/s. The light input/output surfaces were processed using a dicing blade with particle size #3000, under the condition of a rotational speed of 30,000 rpm and a cutting speed of 0.5 mm/s. The side surfaces had a surface roughness in the optical axis direction of Ra=0.3 μm, and a surface roughness in the optical axis perpendicular direction of Ra=1.0 μm. The light input/output surfaces had a surface roughness of Ra=2.0 μm. In the present example, the surface roughness was determined by measuring a center line average roughness Ra according to JIS B0601' 1982.

When the side surfaces were observed as enlarged using a metal microscope, the cutting surface exhibited no protrusion of the second medium from the side surfaces, and the particles had been severed. In a non-cutting side surface, the second medium was embedded in the first medium without protruding from the side surface.

As the light source, an LED (LTRB R8SF manufactured by OSRAM) was used. The LED has three chips for red, green, and blue, and can be expected to provide improved color reproducibility compared with a white LED. The LED was disposed in close contact with the center of the entrance surface of the optical integrator. Using the anode in common, the LED was lit by applying a voltage of 2.7 V thereto with a resistor of 1 kΩ disposed between ground and the red chip and a resistor of 150 Ω between ground and the blue chip. Then, the frontal luminance on the exit surface of the optical integrator, uniformity, and color mixing property were evaluated. The luminance meter used was the CA-1500 (trade name) manufactured by Konica Minolta, Inc. With regard to the exit surface, data of luminance, chromaticity x, and chromaticity y were measured in 11 divisions in the width direction and 11 divisions in the height direction, for a total of 121 divisions, and an average luminance, uniformity, and color mixing property were calculated as follows.
Average luminance: Average value of frontal luminance at 121 measurement points
Uniformity: Minimum value/maximum value of frontal luminance at 121 measurement points
Color mixing property: Maximum value–minimum value of chromaticity at 121 measurement points As a result of the measurement, the average luminance was 34,400 cd/m$^2$, uniformity was 90.7%, the color mixing property for chromaticity x was 0.020, and the color mixing property for chromaticity y was 0.024, and light equalization was achieved while sufficient brightness was ensured.

In the drawings for the present example, the same signs are allocated to the same functions, such as the red chip 031, green chip 032, and blue chip 033 in FIG. 3 and FIG. 11, for example.

While in the examples, the multi-chip light sources having three and four chips were described, high homogeneity can of course be also obtained when there is one chip. As long as there are two or more chips, such as five or six chips, both color mixing property and homogeneity can be achieved.

The present invention is not limited to the examples, and may include various modifications. The examples have been described for illustrating the present invention, and are not necessarily limited to those provided with all of the configurations described. The configuration of one example may be incorporated into the configuration of another example. With respect to a part of each example, addition, deletion, or substitution of other configurations may be possible.

Each of the configurations may be partly or entirely configured using hardware, or may be configured to be implemented by a processor executing a program. Control lines and information lines illustrated are those considered necessary for the purpose of description, and do not necessarily correspond to all of the control lines or information lines that are required in a product. It may be considered that, in practice, almost all of the configurations are connected to one another.

REFERENCE SIGNS LIST

001 Optical integrator
002, 003 Entrance/exit surfaces
004 to 007 TIR side surface
008 Scattering particles
011 Picture projection device
012 Light source
014 Micro display (picture generation device)
015 Display area
018 Lens unit
019 Exit window
021 Light detection unit
022 Light travel path
101 Display device

The invention claimed is:

1. An optical integrator for diffusing light, comprising:
an entrance surface for an entry of light;
an exit surface for an exit of the light; and
a side surface connecting the entrance surface and the exit surface,
wherein:
the optical integrator is internally filled with a light guide material having a first refractive index N1;
the light guide material contains scattering particles for scattering light having a second refractive index N2 different from the first refractive index N1, wherein the difference between the first refractive index N1 and the second refractive index N2 is between 0.005 and 0.015, and the scattering particles have a diameter not greater than 10 times the wavelength of a ray of the light;
the light that has entered via the entrance surface propagates from the entrance surface side toward the exit surface while being scattered by the scattering particles in the light guide material; and
part of the scattered light is internally reflected by the side surface and guided to the exit surface.

2. The optical integrator according to claim 1, wherein the entrance surface and the exit surface are opposed substantially in parallel to each other.

3. The optical integrator according to claim 1, wherein the entrance surface and the exit surface have substantially the same shape.

4. The optical integrator according to claim 1, wherein the side surface is substantially perpendicular to the entrance surface.

5. The optical integrator according to claim 1, wherein the side surface has a surface roughness (Ra) in an optical axis direction, where $0 < Ra \leq 0.5$ μm.

6. The optical integrator according to claim 1, wherein the side surface has a surface roughness (Ra) in an optical axis direction which is not more than ½ an average particle size of the scattering particles.

7. The optical integrator according to claim 1, wherein the side surface has a surface roughness (Ra) in an optical axis direction which is smaller than a surface roughness (Ra) of the side surface in a direction perpendicular to the optical axis.

8. The optical integrator according to claim 1, wherein the entrance surface and/or the exit surface has a surface roughness (Ra) which is greater than a surface roughness (Ra) of the side surface in an optical axis direction.

9. The optical integrator according to claim 1, wherein the side surface has a length between the entrance surface and the exit surface which is greater than three times a maximum size of the width of the entrance surface and the width of the exit surface.

10. The optical integrator according to claim 1, wherein the light enters the entrance surface from a light source having two or more light emission points.

11. The optical integrator according to claim 10, wherein:
the light enters the entrance surface from the light source having three or more light emission points; and
the three or more light emission points are non-coaxially arranged.

12. A picture projection device for externally projecting a picture, comprising:
a light source having two or more light emission points;
the optical integrator according to claim 1 into which the light that has exited the light source enters;
a picture generation device that generates a picture;
a lens unit that illuminates the picture generation device with the light exiting the optical integrator; and
a projection unit that externally projects the picture that has exited the picture generation device.

\* \* \* \* \*